United States Patent [19]

Holden

[11] Patent Number: 5,483,838

[45] Date of Patent: Jan. 16, 1996

[54] FLUID FLOW CONNECTOR AND GAUGE ASSEMBLY

[76] Inventor: Edward S. Holden, 16 Lowell St., Cambridge, Mass. 02138

[21] Appl. No.: 369,372

[22] Filed: Jan. 6, 1995

Related U.S. Application Data

[63] Continuation-in-part of Ser. No. 175,973, Dec. 29, 1993, abandoned.

[51] Int. Cl.$^6$ ....................................................... G01F 1/00
[52] U.S. Cl. ..................... 73/861.61; 73/861.52
[58] Field of Search ..................... 73/215, 756, 861.42, 73/861.52, 714, 861.47, 861.48, 861.61

[56] References Cited

U.S. PATENT DOCUMENTS

| | | | |
|---|---|---|---|
| 1,697,344 | 1/1929 | Campbell | 73/861.61 |
| 2,564,272 | 8/1951 | Morton | 73/861.61 |
| 2,897,675 | 8/1959 | Kocher et al. | 73/420 |
| 3,385,112 | 5/1968 | Pruitt et al. | 73/420 |
| 3,797,317 | 3/1974 | Peterson, Jr. | 73/756 |
| 3,999,430 | 12/1976 | Parduhn | 73/756 |
| 4,169,386 | 10/1979 | McMahon | 73/700 |
| 4,534,224 | 8/1985 | Raftis | 73/730 |
| 4,763,516 | 8/1988 | Greenspan | 73/756 |
| 4,901,761 | 2/1990 | Taylor | 137/557 |
| 4,972,180 | 11/1990 | Akai et al. | 73/861.61 |
| 4,986,128 | 1/1991 | Burns | 73/744 |
| 5,154,083 | 10/1992 | Bernstein et al. | 73/730 |

FOREIGN PATENT DOCUMENTS 2623644  12/1977  Germany ..................... A62C 37/00

Primary Examiner—Kenneth A. Wieder
Assistant Examiner—R. Biegel
Attorney, Agent, or Firm—Fish & Richardson

[57] ABSTRACT

A connector and gauge assembly for measuring liquid pressure and flow rate has an axially elongated integral tubular body with an externally threaded male end and an opposite female end. The tubular body defines an axial main conduit, and a test conduit generally transverse thereto. An internally threaded sleeve is rotatably mounted upon the body at the female end for connection of the main conduit to a source of liquid under pressure. A closure element is associated with the tubular body for resisting flow of liquid through the main conduit. A gauge of pressure and flow rate is mounted upon the tubular body in communication with the test conduit, the gauge having a display for indicating pressure and flow rate.

5 Claims, 5 Drawing Sheets

FLUID FLOW CONNECTOR AND GAUGE ASSEMBLY

This application is a continuation-in-part of U.S. application Ser. No. 08/175,973, filed Dec. 29, 1993, now abandoned.

BACKGROUND OF THE INVENTION

This invention relates to devices for measuring liquid pressure and flow rate.

Gauge assemblies for measuring fluid pressure in a line to or from a fluid source are described in the prior art. For example, Burns U.S. Pat. No. 4,986,128 describes an in-line gas pressure gauge assembly; McMahan U.S. Pat. No. 4,169,386 describes a water pressure gauge for use with irrigation lines; German Patent No. 2623644 (Schwahn et al.) describes an in-line pressure gauge for use with water pipes, e.g. fire hydrant supply lines.

SUMMARY OF THE INVENTION

According to one aspect of the invention, a connector and gauge assembly for measuring liquid pressure and flow rate comprises an axially elongated integral tubular body having an externally threaded male end portion and an opposite female end portion, the integral tubular body defining an axial main conduit, and a test conduit generally transverse to the main conduit, an internally threaded sleeve rotatably mounted upon the integral tubular body at the female end portion and adapted for connection of the main conduit to a source of liquid under pressure; a closure element associated with the integral body for resisting flow of liquid through the main conduit; and a gauge of pressure and flow rate mounted upon the integral tubular body and in communication with the test conduit, the gauge having a display for indicating pressure and flow rate.

In preferred embodiments of this aspect of the invention, the axially elongated integral tubular body further comprises a transverse end portion disposed generally between the male and female end portions, the transverse end portion defining the test conduit and an internally threaded bore in communication therewith for removably receiving the gauge of pressure and flow rate in threaded engagement. The display of the gauge is calibrated for simultaneous indication of pressure and flow rate. The closure element comprises a ball valve defining a flow orifice located within the main conduit and a control knob for adjusting the size of the flow orifice.

According to another aspect of the invention, a method for determining liquid supply pressure at a spigot having an externally threaded male outlet comprises the steps of providing a connector and gauge assembly generally as described above for measuring at least liquid pressure; engaging the internally threaded sleeve of the tubular body with the spigot threads to connect the main conduit to the source of liquid under pressure; adjusting the closure element to resist flow of liquid through the main conduit; opening the spigot; and observing the indication of liquid pressure in the main conduit displayed upon the display of the gauge.

According to still another aspect of the invention, a method for determining line pressure and flow rate in a line of hosing having an externally threaded male outlet and an opposed internally threaded female inlet comprises the steps of providing a connector and gauge assembly for measuring liquid pressure and flow rate generally as described above; engaging the internally threaded sleeve of the tubular body with the externally threaded male outlet of the hosing to connect the main conduit to the source of liquid under pressure; engaging the externally threaded male end portion of the tubular body with the internally threaded female inlet of the hosing; adjusting the closure element to allow flow of liquid through the main conduit; actuating the flow of liquid through the hosing; and observing the indication of liquid pressure and flow rate displayed upon the display of the gauge.

According to yet another aspect of the invention, a method for determining termination pressure of a system of hosing having an externally threaded male termination, comprises the steps of providing a connector and gauge assembly for measuring liquid pressure generally as described above; engaging the internally threaded sleeve of the tubular body with the externally threaded male termination to connect the main conduit to the source of liquid under pressure; adjusting the closure element to resist flow of liquid through the main conduit; actuating the system of hosing; and observing the indication of termination liquid pressure in the main conduit displayed upon the display of the gauge.

Objectives of the invention include providing an inexpensive, versatile and easy to use gauge assembly that is accurate enough to measure liquid pressure and liquid flow rates.

These and other features and advantages of the invention will be seen from the following description of a presently preferred embodiment, and from the claims.

DESCRIPTION OF THE PREFERRED EMBODIMENTS

Figure 1:
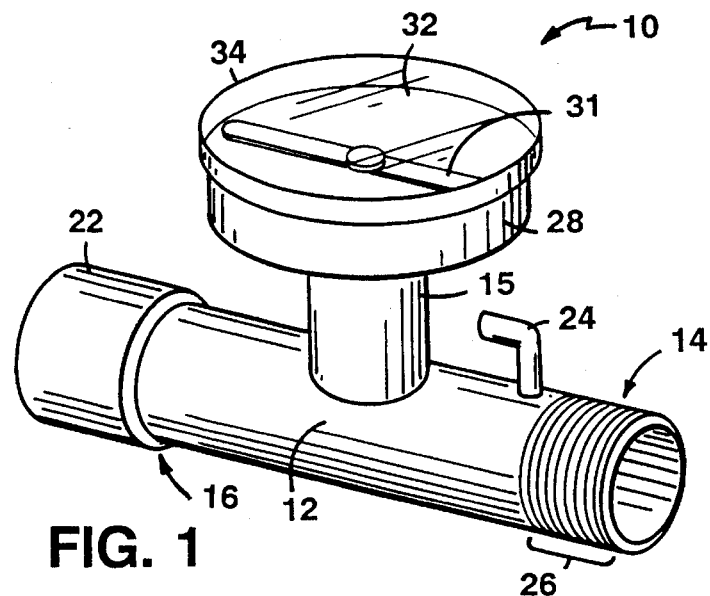
FIG. 1 is a perspective view of a liquid pressure and flow rate gauge and connection assembly of the invention.
Figure 2:
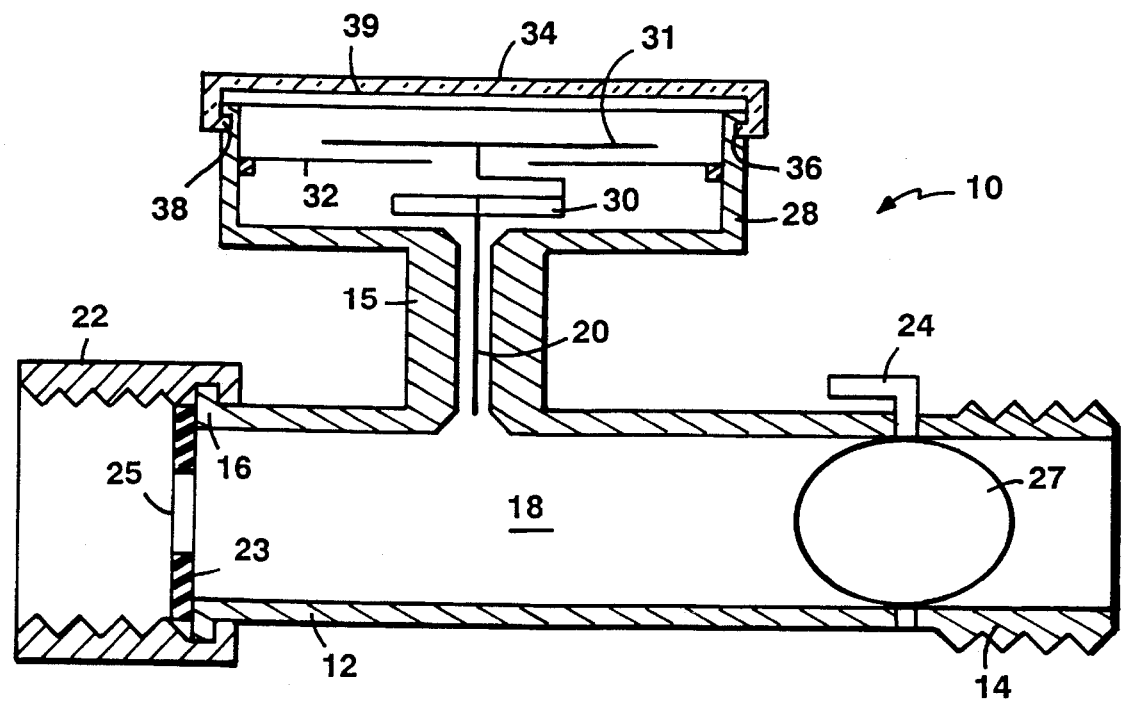
FIG. 2 is a side section view of the liquid pressure and flow rate gauge and connector assembly of FIG. 1, taken along line 2—2 of FIG. 1.

Referring to FIGS. 1 and 2, a liquid pressure and flow rate gauge and connector assembly 10 of the invention for measuring pressure and flow rate has an axially elongated integral tubular body 12 with an externally threaded male end portion 14 and an opposite female end portion 16, and a transversely extending gauge body portion 15 generally therebetween. The body 12 defines an axial main conduit 18, and a test conduit 20 communicating with and generally transverse to the main conduit. An internally threaded sleeve 22 is rotatably mounted upon the integral tubular body 12 at the female end 16, the sleeve being adapted for connection of the main conduit 18 to a source of liquid under pressure, as will be described more fully below. A resilient sealing washer 23 located within sleeve 22 defines a limiting flow orifice 25. A closure element, e.g. a ball valve 24, defining a valve flow orifice 27, is rotatably adjustable to control flow of liquid through the main conduit 18. When ball valve 24 is adjusted such that flow orifice 27 is fully open (FIG. 2), the washer flow orifice 25 is the minimum flow orifice and thus a limiting factor in the maximum flow rate attainable through main conduit 18.

Figure 3:
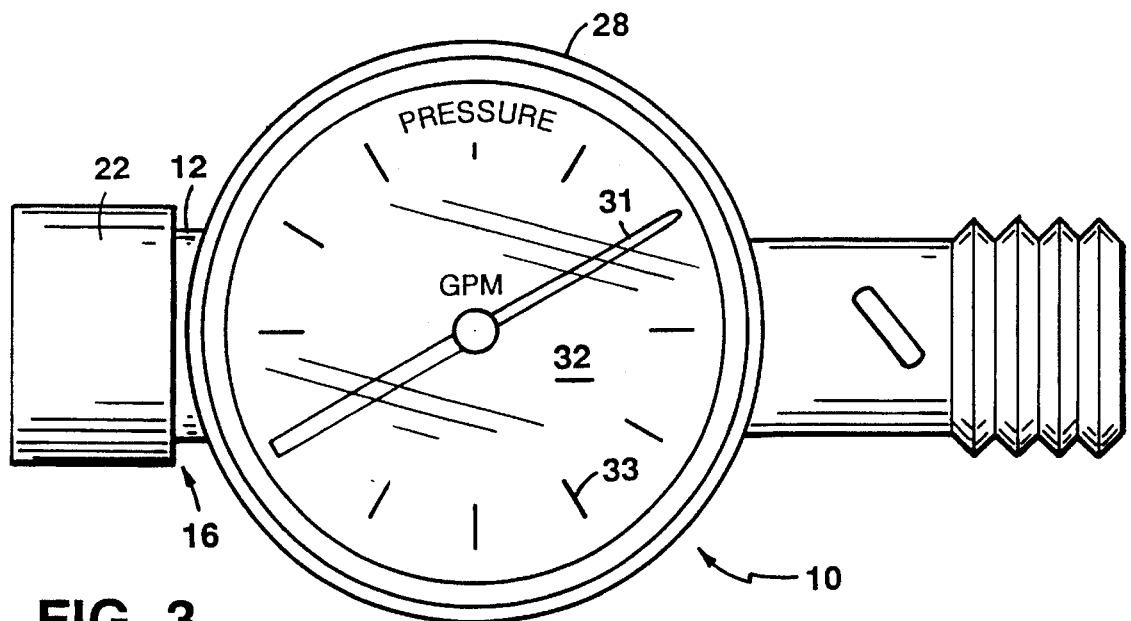
FIG. 3 is a top plan view of the liquid pressure and flow rate gauge and connector assembly of FIG. 1.
Figure 3A:
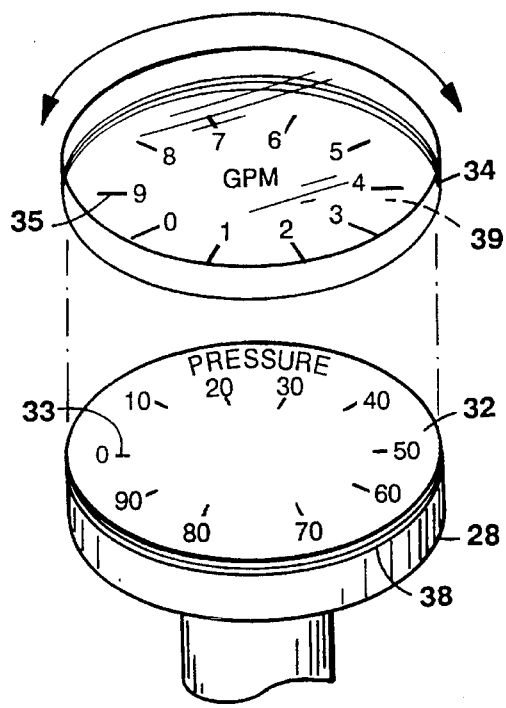
FIG. 3a is an exploded view of the gauge housing and dial display in an assembly of the invention.

The integral body 12 further defines a gauge housing 28 within which there is disposed a liquid pressure gauge 30 mounted in communication with the test conduit 20. Referring also to FIG. 3 and 3*a*, gauge 30 includes a pointer needle 31 and a first (pressure) display surface 32 marked to indicate gradations of liquid pressure 33, disposed behind a protective transparent dial or cover 34. The inner surface of the dial has a second (flow rate) display surface 39 marked to indicate gradations of liquid flow rate 35. Referring to FIG. 2, dial 34 is rotatably coupled to gauge housing 28 by a lip 36 engaged in a slot 38 about the outer circumference of gauge housing 28. As described in more detail below, the liquid flow rate display surface 39 is thus rotatably adjustable relative to the liquid pressure display surface 32 to reflect available line pressure.

In the preferred embodiment, the body 12, including the gauge housing 28, is integrally formed by molding from a suitable plastic. The sleeve 22 and ball valve 24 are also preferably formed of plastic.

Figure 4:
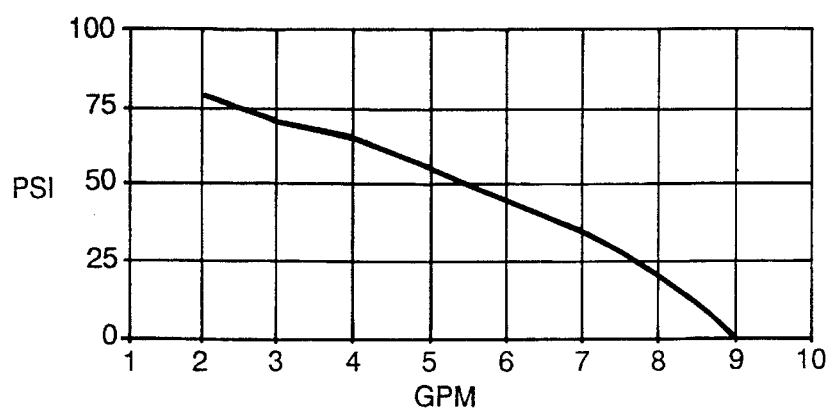
FIG. 4 is a calibration curve of flow rate versus gauge pressure for a typical assembly of the invention.

The relationship of liquid pressure versus liquid flow rate is determined for the assembly 10 having a predetermined limiting flow orifice 25, defined by the washer 23. Liquid pressure and flow rate gauge and connector assembly 10 is connected to a liquid source and the flow rate at different flow pressures is measured, e.g. using a flow meter, or by measuring the volume of liquid that has flowed into a container after a predetermined period of time. The flow rate is varied by adjusting the ball valve 24, and thus the position of the ball valve orifice 27, while the output pressure from the source remains constant. At sequential position of the ball valve, a pressure reading is taken as indicated on display surface 32 and the flow rate is measured. A typical calibration curve, shown in FIG. 4 for a constant supply pressure of about 90 psi, though not linear, is sufficiently close to provide a good indication of liquid flow rate based on the measurement of liquid pressure. Since in use the liquid pressure reading on display surface 32 is the pressure within the assembly and not the liquid pressure exiting the assembly (the pressure exiting the assembly being the supply pressure minus the pressure reading on display surface 32), indices 35 are marked on display surface 39 from high flow rate to low flow rate clockwise around the dial (FIG. 3*a*).

Figure 4A:
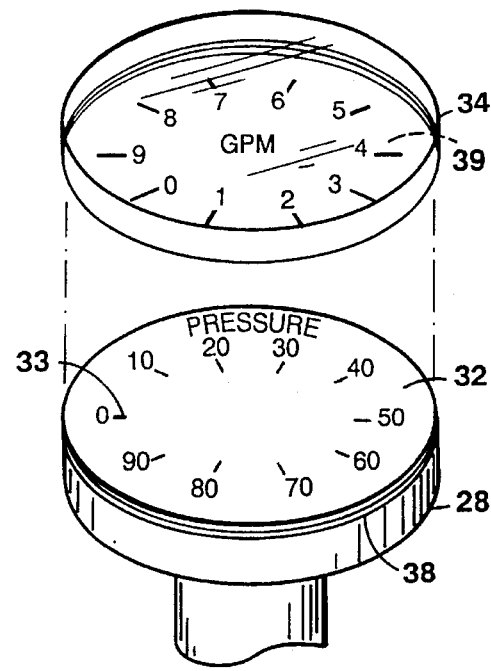
FIGS. 4a–4c show the dial display of the invention positioned for measuring flow rate.
Figure 4B:
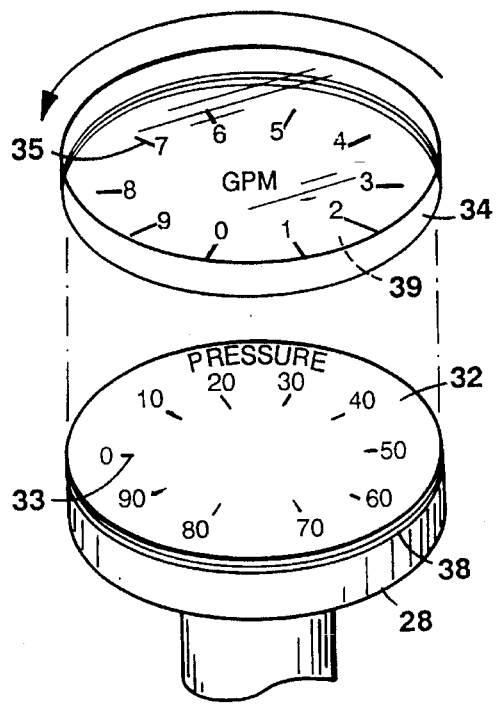
Figure 4C:
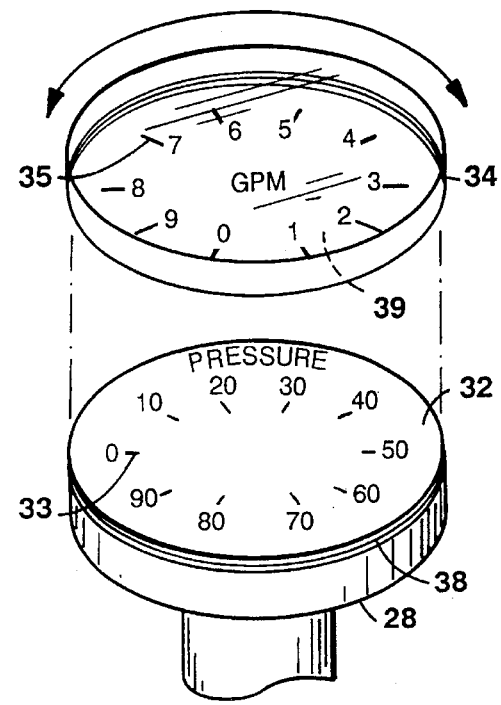

Referring also to FIGS. 4*a*–4*c*, in use, liquid pressure and flow rate gauge and connector assembly 10 of the invention is attached to a source of liquid under pressure. The ball valve 24 is closed, and the source is turned on to a desired pressure, or to maximum line pressure, e.g. 80 psi, as read on pressure display surface 32 of gauge 30 (FIG. 4*a*). On the basis of the calibration information, shown in the curve of FIG. 4, it is known that, with the ball valve fully open, the liquid pressure display will show "0 psi", while the pressure of liquid exiting through the assembly will be 80 psi. In order to provide an accurate indication of flow rate through the assembly, the dial 34 is rotated to align the pressure indicator of "80 psi" (the known maximum gauge pressure through the assembly) with the flow rate indicator for "0 gpm" (gallons per minute), as shown in FIG. 4*b*. As a result of this adjustment, the pressure indication for "0 psi" (achieved at the maximum supply pressure (80 psi) when the ball valve is fully open) is aligned with the flow rate indication of "8 gpm", the flow rate through the assembly at 80 psi. The pressure of flow through the assembly can then be adjusted (between 0 psi and 80 psi) by positioning of the ball valve 24, with the gauge pointer indicating the pressure within the assembly and also indicating the liquid flow rate through the assembly. For example, if ball valve 24 is adjusted such that needle 31 indicates on display surface 32 a pressure of 25 psi within the assembly, needle 31 will also indicate on display surface 39 a flow rate of 5 gpm (FIG. 4*c*) (5 gpm corresponding to 55 psi, or source pressure minus the pressure within the assembly, on the calibration curve, FIG. 4).

At any time, the ball valve 24 can be closed for confirmation of the supply pressure. If the supply pressure changes from the initial predetermined pressure, the flow rate gauge is adjusted accordingly by rotation of the dial, after reference to the calibration graph for the new predetermined pressure. For example, if the new predetermined supply pressure is 50 psi, dial 34 is rotated to align the indication of "50 psi" with the indication of "0 gpm" on display surface 32.

Figure 5:
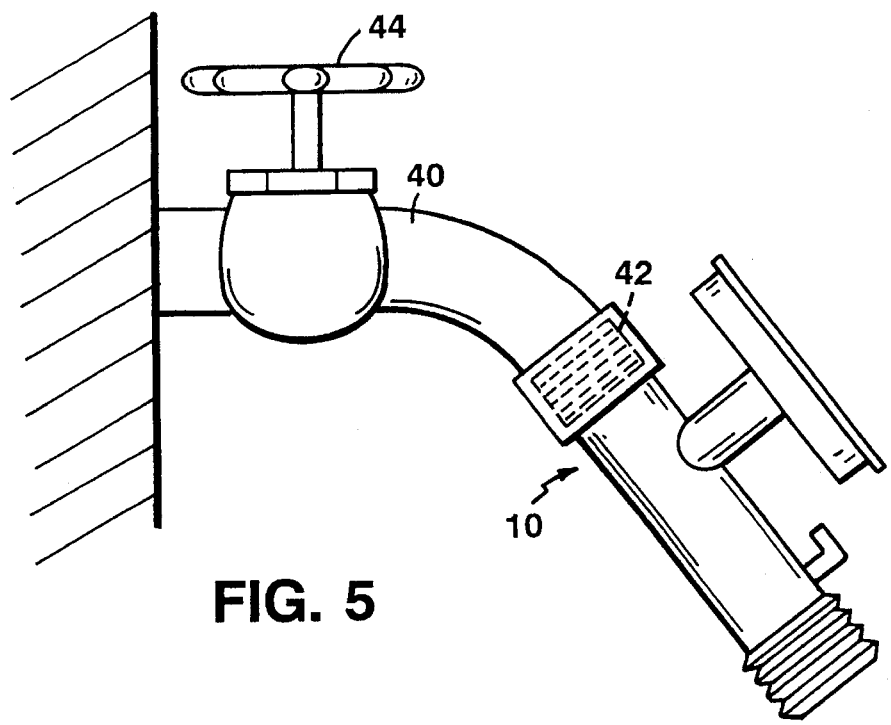
FIG. 5 is a somewhat diagrammatic side view of the liquid pressure and flow rate gauge and connector assembly of the invention employed for determining supply pressure.
Figure 6:
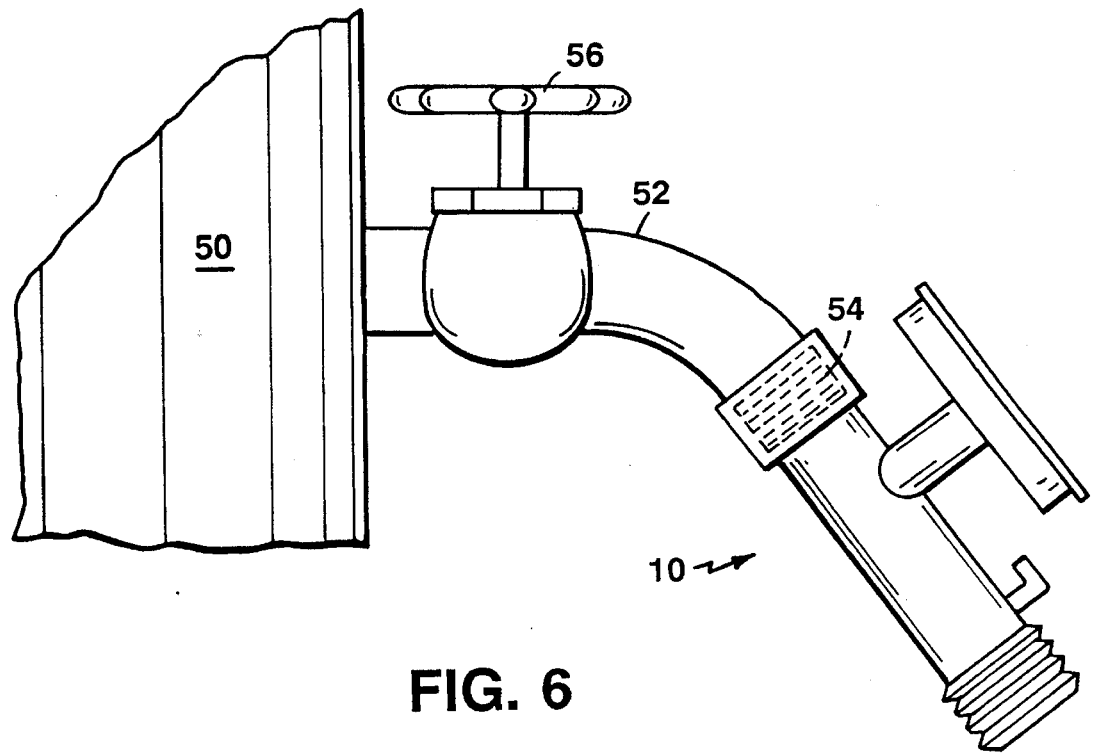
FIG. 6 is a similar view of the liquid pressure and flow rate gauge and connector assembly of the invention employed for determining line flow rate and pressure.

Referring now to FIGS. 5 and 6, a liquid pressure and flow rate gauge and connector assembly 10 of the invention is shown for use in determining water supply pressure, e.g. from a spigot 40 outside a home or in a domestic hot water heater 50.

In FIG. 5, a liquid pressure and flow rate gauge and connector assembly 10 of the invention is attached to the spigot 40 by engaging the internally threaded sleeve 22 of the tubular body 12 with the spigot threads 42 to connect the main conduit 18 to the source of liquid under pressure (not shown). Ball valve 24 is adjusted to close flow orifice 27 to resist flow of liquid through the main conduit. The spigot 40 is opened (by turning handle 44) and the supply pressure is determined by observing the indication of liquid pressure in the main conduit displayed upon the pressure display surface 32 of the gauge 30.

Similarly, referring to FIG. 6, for determining hot water supply pressure in a home, a liquid pressure and flow rate gauge and connector assembly 10 of the invention is attached to the drain spigot 52 of a domestic hot water heater 50 by engaging the internally threaded sleeve 22 of the tubular body 12 with the spigot threads 54 to connect the main conduit 18 to the hot water contained under pressure within the heater 50. Ball valve 24 is adjusted to close flow orifice 27 to resist flow of liquid through the main conduit. The spigot 52 is opened (by turning handle 56) and the supply pressure is determined by observing the indication of liquid pressure in the main conduit displayed upon the pressure display surface 32 of the gauge 30.

Figure 7:
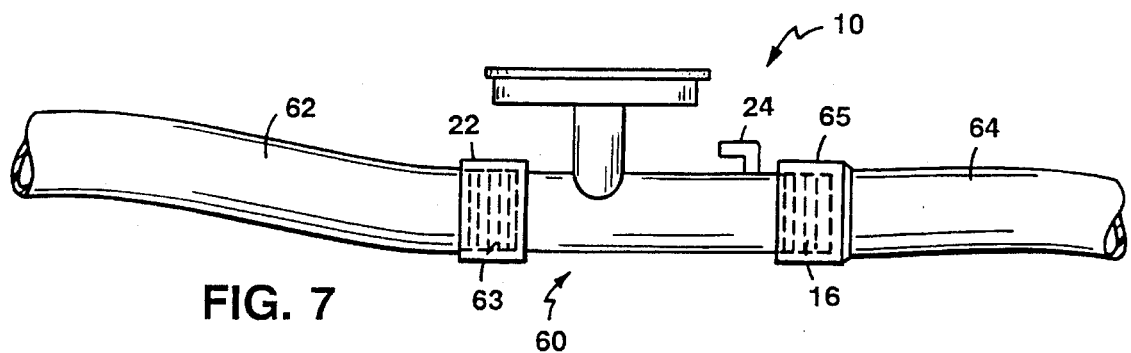
FIG. 7 is a similar view of the liquid pressure and flow rate gauge and connector assembly of the invention employed for determining line termination pressure.

Referring now to FIG. 7, for determining line pressure and flow rate, e.g. in a system of hosing 60, opposed ends of hoses 62, 64 are disengaged, and a liquid pressure and flow rate gauge and connector assembly 10 of the invention is attached therebetween. In particular, the sleeve 22 of the tubular body 12 is threaded onto the externally threaded male outlet 63 of hose 62 to connect the main conduit 18 to the remote source of liquid under pressure (not shown) and the externally threaded male end portion 14 of the tubular body 12 is engaged upon the internally threaded female inlet end 65 of the hose 64. The remote source is actuated to cause flow of liquid through the hosing system 60 with the gauge and connector assembly 10 in place. Ball valve 24 is adjusted to close flow orifice 27 and the liquid flow rate dial 34 is set, as described above, to measure flow rate. Ball valve 24 is then adjusted to allow flow. The liquid pressure is displayed upon the pressure display surface 32 of dial 34, and the liquid flow rate is simultaneously displayed upon the flow rate display surface 39 of dial 34. The pressure and flow rate can be adjusted by the varying the position of ball valve 24.

Figure 8:
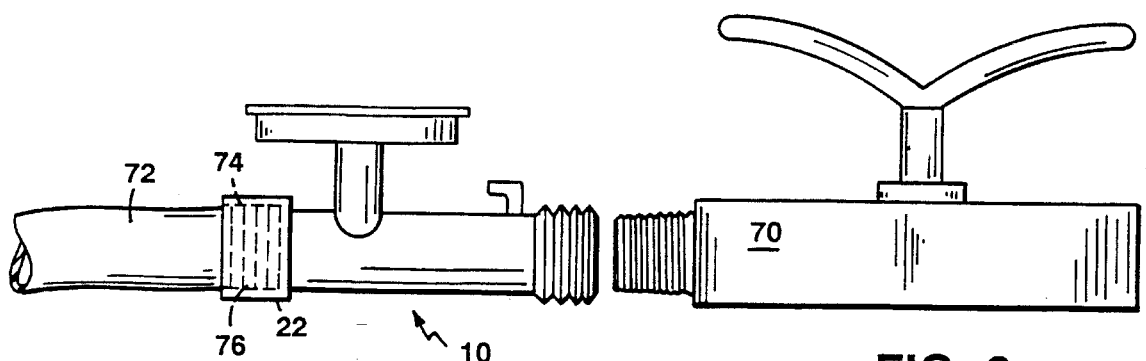
FIG. 8 is a similar view of the liquid pressure and flow rate gauge and connector assembly of the invention employed for determining line pressure, e.g. to an irrigation sprinkler.

Referring to FIG. 8, the liquid pressure and flow rate gauge and connector assembly 10 of the invention is employed for determining termination pressure, e.g. at a sprinkler 70 at the end of a hose 72. The sprinkler 70 is detached from the hose, and the gauge and connector assembly 10 is attached in its place to the outlet end 74 of the hose by engaging the internally threaded sleeve 22 of the tubular body 12 with the male hose threads 76 to connect the main conduit 18 to the source of liquid under pressure (not shown). Ball valve 24 is closed. The water supply to the sprinkler 70 is actuated and the supply pressure is determined by observing the indication of liquid pressure in the main conduit displayed upon the pressure display surface 32 of the gauge 30.

Other embodiments are within the following claims. For example, one or more elements may be formed of other materials, e.g. metal or other suitable plastic, and by other processes, e.g. casting or machining.

Figure 9:
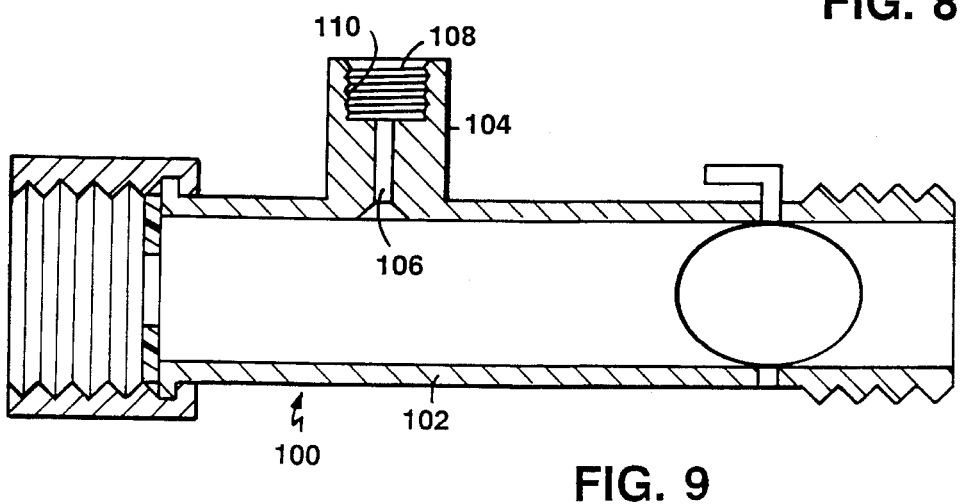
FIG. 9 is a side section view of an alternate embodiment of a connector for a liquid pressure and flow rate gauge and connector assembly of the invention.

Also, referring to FIG. 9, in an alternate embodiment, a liquid pressure and flow rate gauge and connector assembly 100 of the invention has an axially elongated integral tubular body 102 for use with a replaceable gauge of liquid pressure and flow rate. The body 102 of this embodiment has a transverse body portion 104 defining a test conduit 106 with an end bore 108 having internal threads 110 for receiving the gauge and connector assembly 100 in threaded engagement.

Also, the ball valve flow orifice instead may be the minimum flow orifice and thus the limiting factor in the maximum flow rate attainable through main conduit 18.

What is claimed is:

1. A gauge and connector assembly for measuring liquid pressure and flow rate, comprising:

an axially elongated, integral tubular body having an externally threaded male end portion and an opposite female end portion, said integral tubular body defining an axial main conduit, and a test conduit generally transverse to said main conduit;

an internally threaded sleeve rotatably mounted upon said integral tubular body at said female end portion and adapted for connection of said main conduit to a source of liquid under pressure;

a closure element associated with said integral body for resisting flow of liquid through said main conduit; and a gauge of pressure and flow rate mounted upon said integral tubular body and in communication with said test conduit, said gauge comprising a pointer, a first display surface for indication of liquid pressure, and a second display surface for indication of liquid flow rate, said first display surface and said second surface display being mutually adjustable.

2. The gauge and connector assembly of claim 1 wherein said axially elongated integral tubular body further comprises a transverse end portion disposed generally between said male end portion and said female end portion, said transverse end portion defining said test conduit, and an internally threaded bore in communication therewith for removably receiving said gauge of pressure and flow rate in threaded engagement.

3. The gauge and connector assembly of claim 1 wherein said closure element comprises a ball valve defining a flow orifice located within said main conduit and a control knob for adjusting the size of said flow orifice.

4. The gauge and connector assembly of claim 1, wherein said first surface is stationary and said second surface is rotatably adjustable with respect to said first surface.

5. A method for determining liquid line pressure and flow rate in a line of hosing having an externally threaded male outlet and an opposed internally threaded female inlet, the method comprising the steps of:

providing a connector and gauge assembly for measuring liquid pressure and flow rate comprising an axially elongated integral tubular body having an externally threaded male end portion and an opposite female end portion, said integral tubular body defining an axial main conduit, and a test conduit generally transverse to said main conduit, an internally threaded sleeve rotatably mounted upon said integral tubular body at said female end portion and adapted for connection of said main conduit to a source of liquid under pressure via the spigot; a closure element associated with said integral body for resisting flow of liquid through said main conduit; and a gauge of liquid pressure and flow rate mounted upon said integral tubular body and in communication with said test conduit, said gauge comprising a pointer, a first display for indicating liquid pressure and a second display for indicating liquid flow rate, said first display surface and said second surface display being mutually adjustable, said main conduit having a predetermined cross-sectional area and said display of said gauge being calibrated for simultaneous indication of pressure and flow rate;

engaging the internally threaded sleeve of the tubular body with the externally threaded male outlet of the hosing to connect the main conduit to the source of liquid under pressure;

engaging the externally threaded male end portion of the tubular body with the internally threaded female inlet of the hosing;

adjusting said closure element to allow flow of liquid through said main conduit;

actuating the flow of liquid through the hosing; and observing the indications of liquid pressure and liquid flow rate displayed upon the first and second displays of said gauge.

* * * * *